US012111751B2

(12) United States Patent
Clement et al.

(10) Patent No.: US 12,111,751 B2
(45) Date of Patent: Oct. 8, 2024

(54) DEBUGGING TOOL FOR CODE GENERATION NEURAL LANGUAGE MODELS

(71) Applicant: MICROSOFT TECHNOLOGY LICENSING, LLC., Redmond, WA (US)

(72) Inventors: Colin Bruce Clement, Seattle, WA (US); David Alberto Nader Palacio, Williamsburg, VA (US); Neelakantan Sundaresan, Bellevue, WA (US); Alexey Svyatkovskiy, Bellevue, WA (US); Michele Tufano, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 113 days.

(21) Appl. No.: 18/082,366

(22) Filed: Dec. 15, 2022

(65) Prior Publication Data

US 2024/0104001 A1 Mar. 28, 2024

Related U.S. Application Data

(60) Provisional application No. 63/408,288, filed on Sep. 20, 2022.

(51) Int. Cl.
G06F 9/44 (2018.01)
G06F 11/36 (2006.01)
(52) U.S. Cl.
CPC ............... *G06F 11/3636* (2013.01)

(58) Field of Classification Search
None
See application file for complete search history.

(56) References Cited

U.S. PATENT DOCUMENTS

| | | | | |
|---|---|---|---|---|
| 9,489,283 | B1 * | 11/2016 | Popovici | G06F 11/3636 |
| 10,204,030 | B1 * | 2/2019 | Hockett | G06F 11/3636 |
| 2005/0120272 | A1 * | 6/2005 | Smith | G06F 11/3664 |
| | | | | 714/38.1 |
| 2009/0327809 | A1 * | 12/2009 | Joy | G06F 11/3636 |
| | | | | 714/E11.026 |
| 2015/0095017 | A1 * | 4/2015 | Mnih | G06N 3/045 |
| | | | | 704/9 |
| 2019/0303158 | A1 * | 10/2019 | Brar | G06F 11/3636 |

FOREIGN PATENT DOCUMENTS

WO 2022164668 A1 8/2022

OTHER PUBLICATIONS

Dong et al., "Confidence Modeling for Neural Semantic Parsing," arXiv:1805.04604v1, XP080877419, May 12, 2018, 11 pages.

(Continued)

*Primary Examiner* — Qamrun Nahar

(57) ABSTRACT

A debugging tool identifies the smallest subset of an input sequence or rationales that influenced a neural language model to generate an output sequence. The debugging tool uses the rationales to understand why the model made its predictions and in particular, the particular input tokens that had the most impact on the output sequence. In the case of erroneous output, the rationales are used to alter the input sequence to avoid the error or to tailor a new training dataset to retrain the model to improve its performance.

20 Claims, 9 Drawing Sheets

(56) References Cited

OTHER PUBLICATIONS

International Search Report and Written Opinion received for PCT Application No. PCT/US2023/030992, Jan. 5, 2024, 17 pages.
Aggarwal, et al., "Using machine translation for converting Python 2 to Python 3 code", Retrieved From: https://peerj.com/preprints/1459/, Oct. 29, 2015, 4 Pages.
Allamanis, et al., "Learning to Represent Programs with Graphs", In Repository of arXiv:1711.00740v3, May 4, 2018, 17 Pages.
Bender, et al., "On the Dangers of Stochastic Parrots: Can Language Models Be Too Big?", In Proceedings of the ACM Conference on Fairness, Accountability, and Transparency, Mar. 1, 2021, pp. 610-623.
Bengio, et al., "A Neural Probabilistic Language Model", In Journal of Machine Learning Research, vol. 3, Mar. 1, 2003, pp. 1137-1155.
Bommasani, et al., "On the Opportunities and Risks of Foundation Models", In Repository of arXiv:2108.07258v1, Aug. 16, 2021, pp. 1-211.
Chen, et al., "Evaluating Large Language Models Trained on Code", In Repository of arXiv:2107.03374v2, Jul. 14, 2021, 35 Pages.
Chen, et al., "SEQUENCER: Sequence-to-Sequence Learning for End-to-End Program Repair", In Journal of IEEE Transactions on Software Engineering, Sep. 10, 2019, 17 Pages.
Clement, et al., "Long-Range Modeling of Source Code Files with eWASH: Extended Window Access by Syntax Hierarchy", In Proceedings of the Conference on Empirical Methods in Natural Language Processing, Nov. 7, 2021, pp. 4713-4722.
Cruz-Benito, et al., "Automated Source Code Generation and Auto-completion Using Deep Learning: Comparing and Discussing Current Language-Model-Related Approaches", Retrieved From: https://openai.com/blog/openai-api/, Jun. 11, 2020, 7 Pages.
Doshi-Velez, et al., "Considerations for Evaluation and Generalization in Interpretable Machine Learning", In Proceedings of Explainable and Interpretable Models in Computer Vision and Machine Learning, Aug. 24, 2018, pp. 1-17.
Doshi-Velez, et al., "Towards a rigorous science of interpretable machine learning", In Repository of arXiv:1702.08608v2, Mar. 2, 2017, pp. 1-13.
Gulwani, et al., "Program Synthesis", In Journal of Foundations and Trends in Programming Languages, vol. 4, Issue 1-2, Jul. 11, 2017, 127 Pages.
Karampatsis, et al., "Open-Vocabulary Models for Source Code", In Proceedings of the 42nd International Conference on Software Engineering, May 23, 2020, pp. 1073-1085.
Karampatsis, et al., "Maybe deep neural networks are the best choice for modeling source code", In Repository of arXiv:1903.05734, Mar. 13, 2019, 12 Pages.
Karpathy, et al., "Visualizing and understanding recurrent networks", In Journal of Computing research repository, Jun. 5, 2015, pp. 1-13.
Kim, et al., "Interpretability Beyond Feature Attribution: Quantitative Testing with Concept Activation Vectors (TCAV)", In Proceedings of the International Conference on Machine Learning, vol. 6, Jul. 3, 2018, 10 Pages.
Molnar, et al., "Interpretable Machine Learning", In Proceedings of Lulu.com, Feb. 28, 2020, 251 Pages.
Nguyen, et al., "A Statistical Semantic Language Model for Source Code", In Proceedings of 9th Joint Meeting on Foundations of Software Engineering, Aug. 18, 2013, pp. 532-542.
Ouni, et al., "More: A multi-objective refactoring recommendation approach to introducing design patterns and fixing code smells", In Journal of Software Evolution and Process, vol. 29, Issue 5, May 1, 2017, pp. 1-37.
Vafa, et al., "Rationales for Sequential Predictions", In Proceedings of the Conference on Empirical Methods in Natural Language Processing, Nov. 7, 2021, pp. 10314-10332.
Vaswani, et al., "Attention is All You Need", In Proceedings of 31st Conference on Neural Information Processing Systems, Dec. 4, 2017, 11 Pages.
Watson, et al., "A Systematic Literature Review on the Use of Deep Learning in Software Engineering Research", In Journal of ACM Transactions on Software Engineering and Methodology, vol. 31, Issue 2, Mar. 4, 2022, 58 Pages.
Watson, et al., "A Systematic Literature Review on the Use of Deep Learning in Software Engineering Research", In Repository of arXiv:2009.06520v1, Sep. 14, 2020, 48 Pages.

\* cited by examiner

DEBUGGING TOOL FOR CODE GENERATION NEURAL LANGUAGE MODELS

CROSS-REFERENCE TO RELATED APPLICATION

The present application claims the benefit of the earlier filed provisional application having Ser. No. 63/408,288 filed on Sep. 20, 2022, which is incorporated by reference in its entirety.

BACKGROUND

Machine learning pertains to the use and development of computer systems that are able to learn and adapt without following explicit instructions by using algorithms and statistical models to analyze and draw inferences from patterns in data. Machine learning uses different types of statistical methods to learn from features in data and to predict future decisions. A neural language model is a type of machine learning model that uses multiple stages of data processing through many hidden layers of a neural network to learn and interpret the features and the relationships between the features.

Neural language models have been used to automate the generation of source code for different tasks. Neural language models have been used for source code completion, source code repair and source code translation. However, the model is often perceived as a black box that predicts a source code snippet for a given input without any rationale for how the model made its prediction. It is difficult to understand how well the model is able to capture the meaning of the features of a source code snippet, how the model understands the causal relationships in the source code and what influenced the generation of the predicted source code for a given input.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A debugging tool identifies the smallest subset of an input sequence or rationales that influenced a neural language model to generate an output sequence. The debugging tool uses the rationales to understand why the model made its predictions and in particular, the particular input tokens that had the most impact on the output sequence. The rationales are transformed into source code and/or natural language structural concepts that identify the types of training data needed to improve the model's performance. In the case of erroneous output, the rationales are used to facilitate alteration of the input sequence to avoid errors.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
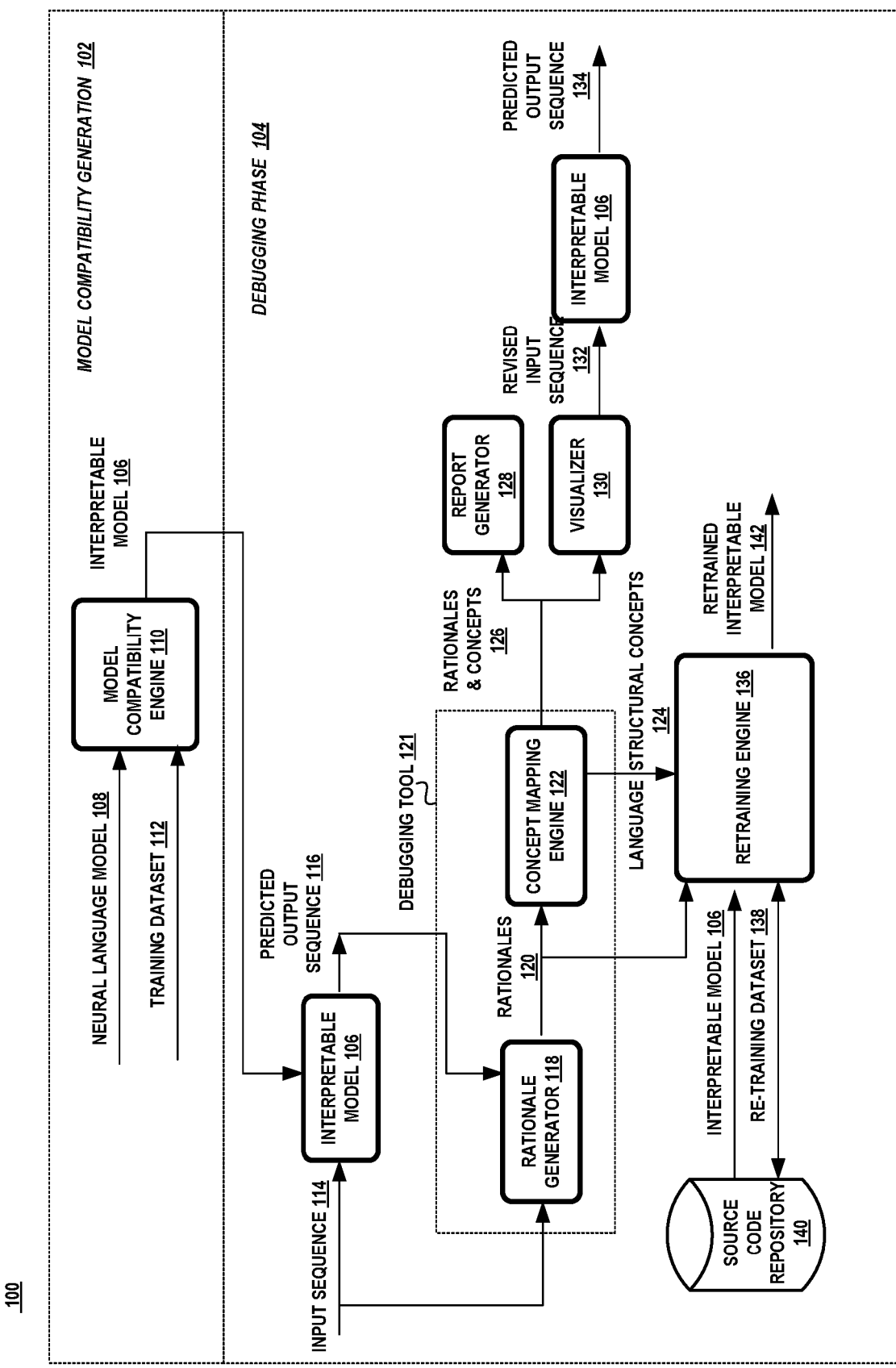
FIG. 1 is a schematic diagram illustrating an exemplary system of a debugging tool for code generation neural language models.

Aspects of the present disclosure pertain to a debugging tool that determines how a neural language model makes a prediction by identifying the smallest subset of an input sequence that influenced the neural language model to generate an output sequence. The debugging tool uses a set of rationales to understand why the model made its predictions and in particular, the particular input that had the most impact on the output. The debugging tool transforms the rationales into source code and/or natural language structural concepts, such as token types, source code categories and/or scopes in order to identify a specific type of training data needed to retrain the model to learn to make predictions that avoid the identified errors.

Source code is an ordered sequence of tokens that adheres to a grammar of a programming language. Natural language text is an ordered sequence of tokens that adheres to the grammar of a natural language. Neural language models that utilize a statistical function based on a conditional probability are often used to make predictions for sequential data, such as natural language text and source code. These models learn to make predictions from the features and relationships between the features found in the training dataset. In some cases, the training data is not adequate for the model to learn from the training dataset. The debugging tool identifies the tokens in an input sequence that influenced the model to generate an output sequence which may have been incorrect. The categorization of these input tokens in terms of source code or natural language structural concepts is used to identify the data needed to retrain the model to improve its predictions and/or to revise the input sequence to avoid mistakes or errors.

Neural language models have been used to perform a variety of code generation tasks. These code generation tasks include, without limitation, code completion, code documentation, code translation, program repair, natural language code summary, unit test case generation, and assert statement generation.

Code completion is a tool that attempts to predict the next string of characters that a developer (e.g., user, end-user, programmer, etc.) may type into a source code development tool, such as a source code editor. Source code may consist of various elements (e.g., keywords, delimiters, variables, methods, constants, operators, etc.) that are combined in a particular order in accordance with the grammar of the underlying programming language to form an expression that is used in a program statement. Code completion is used to complete a partially-formed source code element, such as a method invocation, method signature, parameter list, method body, line of source code, expression, statement, etc.

Code translation translates a source code program or portion thereof written in one programming language into a semantically-equivalent program in a different programming language. Source code differs from natural language text in that developers often use variable names that are made-up and not constrained to known words of a vocabulary, such as words of a natural language vocabulary. This difference requires the model to be trained extensively on different types of training data in order to understand the relationship between the different features of each programming language.

A program repair task predicts a source code bug patch that fixes a source code snippet with a software bug. A neural language model trained for this task may be trained on a training dataset that includes a source code snippet with a software bug and its repaired code in order to learn the relationships between the features of the source code snippet with a software bug and its repaired code.

A natural language code summary is natural language text that describes a particular portion of source code referred to as code documentation. A neural language model may be trained on various types of source code elements with a corresponding docstring in order to learn the relationship between the features of the source code elements (e.g., method signature method body) and a docstring. Likewise, a neural language model may be trained to generate unit test cases from a training dataset consisting of pairs of source code snippets and associated test cases. A neural language model may also be trained to generate assert test statements learned from a training dataset of source code methods, unit tests, and assert test statements.

A neural language model represents source code as sequential data consisting of an ordered sequence of tokens that represents source code and/or natural language text. A software corpora C may be decomposed into a desired granularity of tokens, words, tokens, or subwords, $C=w_1, \ldots, w_T$, by using a transformation function $\Gamma(C)$. This transformation function is a tokenization method for converting a software corpus, such as a source code program or source code snippet, into a sequence of discrete objects $w_t$ for $1 \leq t \leq T$, where T denotes the length of the sequence, $w_t \in$ V, where the vocabulary V is a finite set, and where t is a position in the sequence.

A neural language model is formulated as a probability distribution $P_\theta$ over a fixed granularity of sequences S of software corpra C which is represented as the conditional probability distribution: $P_\theta(S)=P_\theta(w_1, \ldots, w_T)=\Pi_{t=1}^T P_\theta(w_t|w_1, \ldots, w_{t-1})$. The neural language model approximates $P_\theta(w_t|w_1, \ldots, w_{t-1})$ as $P(w_t|h_t)$ where $h_t$ is the hidden state that embeds the sequence information from past observations up to the time step t (i.e., position in the output sequence).

For neural language models used in code translation, sequences S can be decomposed into input $S_V=v<M$ and output $S_W=v<T$ resulting in probability distribution: $P_\theta(S_v, S_w)=P_\theta(v_1, \ldots, v_M, w_1, \ldots, w_T)=\Pi_{t=1}^T P_\theta(w_t|w<t, v_{1:M})$.

The hidden state may be computed using either an autoregressive neural network, such as a neural transformer model with attention or using a recurrent neural network (RNN). Autoregressive models update the hidden state $h_t=f(h_t-1, w<t)$ using the current input $w_t$ and a previous hidden state $h_{t-1}$. Recurrent models update the hidden state $h_t=f(h_t-1, w<t)$ using just the current input $w_t$ and a previous hidden state $h_{t-1}$. Autoregressive models function in a feed-forward manner that predict future values from past information encoded into a hidden state. The techniques disclosed herein may be used with either type of neural language model.

A neural transformer model with attention and a recurrent model are types of machine learning models that perform best on sequential data. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention.

System

FIG. 1 illustrates a block diagram of an exemplary system 100 in which various aspects of the invention may be practiced. Initially, a model compatibility phase 102 is performed offline to generate an interpretable model 106 that is compatible with the neural language model 108 to be debugged. Thereafter, a debugging phase 104 analyzes the output sequences predicted by the interpretable model 106 given an input sequence to determine how the model made its predictions.

In the model compatibility phase 102, a model compatibility engine 110 transforms the neural language model 108 into an interpretable model 106 that can learn to make predictions on data not seen during training or incomplete context. Model compatibility is achieved by fine-tuning the neural language model 108 on a training dataset 112 having dropout.

Model compatibility is a property for approximating the conditional probability distribution $P_\theta(w_t|w_r)$ using $F_\theta(w_t|w_r)$, where $w_t$ represents a token at position t, $w_r$ represents a partially-formatted output sequence, and $P_\theta$ represents a conditional probability distribution based on parameter set D. The function $P_\theta$ is generated by the neural language model 108 trained on complete subsets without token or word dropout. Dropout refers to dropping out tokens or words in an input sequence to train the model to learn to recognize the missing tokens or words in order to produce the same output with the input sequence tokens intact. Dropout reduces overfitting where the model cannot generalize and fits too closely or exactly to the training data.

The incomplete context is generated by randomly dropping tokens/words from the training dataset 112. The training dataset 112 consists of input sequences having known output sequences that the model should predict. Random tokens/words in the input sequences are dropped out and the dropped-out input sequences are applied to the neural language model 108. The neural language model is expected to predict the correct corresponding output sequence.

The model compatibility engine 110 performs the fine-tuning and upon completion, the interpretable model 106 is deployed in a target system to generate source code for an intended code generation task (e.g., code completion, source code repair, code translation, etc.).

During the operation of the interpretable model in the debugging phase 104, the interpretable model 106 receives an input sequence 114 and the model 106 in turn generates a predicted output sequence 116. The rationale generator 118 determines the minimum set of input tokens that influenced the model's generation of each token in the output sequence. This set of input tokens is referred to as the rationales 120.

A concept mapping engine 122 maps the rationales 120 to source code or natural language structural concepts 124 which are used to identify the additional training data that may be needed to retrain the model. In an aspect, the rationale generator 118 and the concept mapping engine 122 comprise a debugging tool 121.

In one aspect, the rationales and associated structural concepts 126 are used by a report generator 128 to identify the rationales and language structural concepts of an input sequence 126 that led the model to generate the predicted output sequence 116. In another aspect, a visualizer 130 displays the rationales and/or language structural concepts 126 onto a user interface for a developer (i.e., user, programmer) to view during usage of the model. The developer may use the user interface to modify the input sequence 132 based on the information provided by the rationales and/or language structural concepts, such as in the case of an error. The revised input sequence 132 may be input into the interpretable model 106 to predict an output sequence 134 based on the revised input sequence 132.

Additionally, the identification of the rationales and language structural concepts may be used to optimize the model. A neural language model takes a limited number of tokens, typically 1024 tokens, in the input sequence from which the model uses for code generation. Due to the constrained size of the input sequence, the input sequence should contain the most important contextual information for the model to produce the output code sequence. The identification of the rationales and language structural concepts is used to guide a developer to decide which parts of the input constitute important information to include for a specific code generation task.

Furthermore, the identification of the rationales and language structural concepts may be used to identify the types of training data more particular for a specific code generation task. The model may then be retrained with the tailored training dataset. A retraining engine 136 uses the rationales 120 and language structural concepts 124 to obtain additional training data 138 from source code repositories 140 to retrain the model. The retrained neural language model 142 may then be used in the target system.

In one aspect, the model compatibility engine 110, the interpretable model 106, the rationale generator 118, the concept mapping engine 122, the report generator 128, the visualizer 130, and the retraining engine 136 may be a sequence of computer program instructions, that when executed by a processor, causes the processor to perform methods and/or operations in accordance with a prescribed task. The model compatibility engine 110, the interpretable model 106, the rationale generator 118, the concept mapping engine 122, the report generator 128, the visualizer 130, and the retraining engine 136 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Attention now turns to a description of the neural language model. In one aspect, the neural language model is a neural transformer model with attention configured with only decoder blocks and in another aspect, the neural language model is a neural transformer model with attention configured with encoder blocks coupled to decoder blocks. However, it should be noted that the techniques described herein are not limited to neural transformer models with attention or with the particular configuration of these models shown herein.

A neural transformer model with attention uses an attention mechanism to relate the significance of different positions of an input embedding sequence to compute a representation of the sequence. Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The attention mechanism is a mapping of a query and a set of key-value pairs to an output. The query (Q), key (K), value (V), and output are vectors. Each value is associated with a weight computed by a compatibility function of the query with its paired key. The output is the weighted sum of the values.

In one aspect, the attention mechanism is a scaled dot-product attention function which is described mathematically as follows:

$$\text{Attention}(Q, K, V) = \text{SoftMax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with ok output values which are concatenated to a final value:

MultiHead($Q,K,V$)=Concat(head$_1$, . . . ,head)$W^o$, where head$_i$=Attention($QW_i^Q$, $KW_i^K$, $VW_i^V$), with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^Q \in \mathbb{R}^{hd_v \times d_{model}}$.

Figure 2:
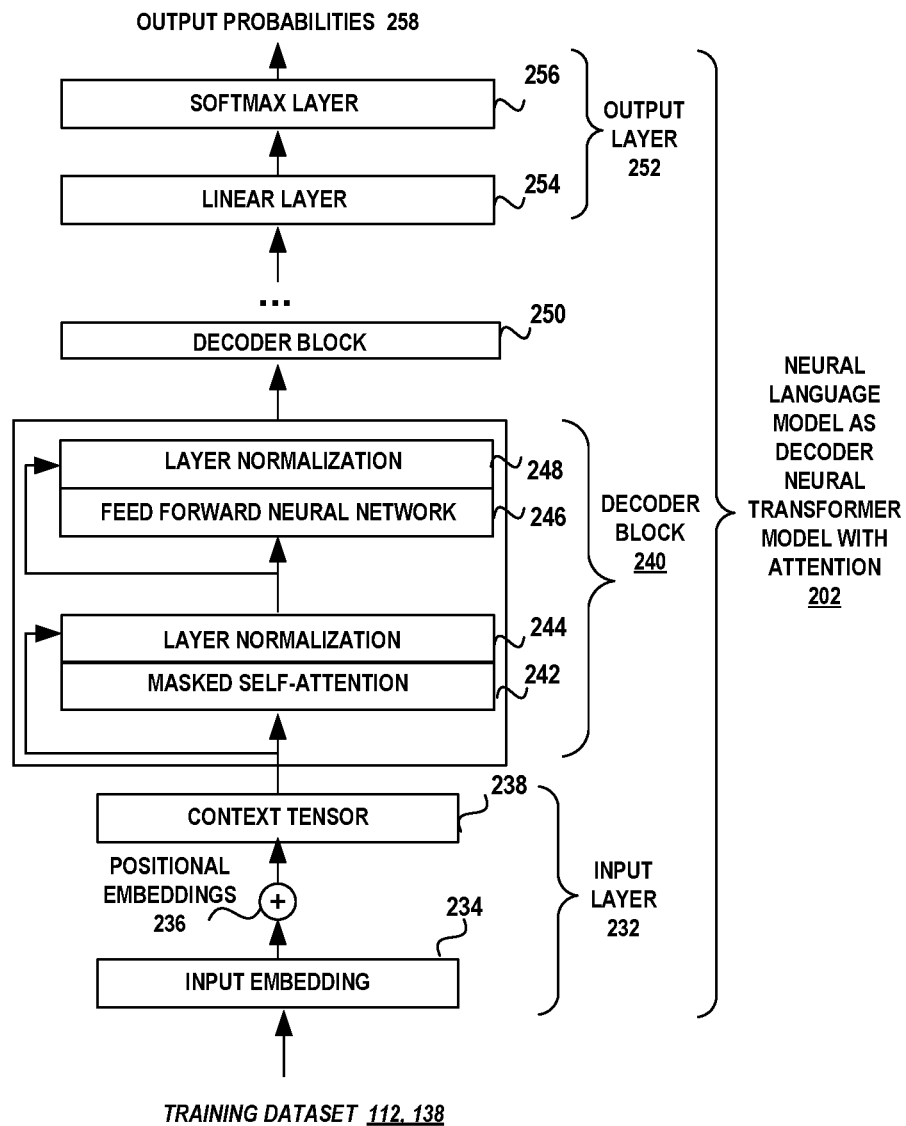
FIG. 2 is a schematic diagram illustrating an exemplary configuration of a neural language model configured as a decoder neural transformer model with attention.

FIG. 2 is an exemplary configuration of a neural language model shown as a neural transformer model with attention configured with only decoder blocks. This configuration is often used for code generation tasks such as code completion. The decoder-only neural transformer model is an auto-regressive model that produces an output one element at a time based on the outputs of previous time steps. Code completion is best suited for a decoder neural transformer model since it is an auto-regressive task that predicts an ordered sequence of tokens where the order depends on the preceding tokens in the sequence. The decoder uses a masked self-head attention which is best suited for autoregressive tasks since it is explicitly trained to generate auto-regressively.

The decoder neural transformer model 202 includes an input layer 232, one or more decoder blocks 240A-240N ("240"), and an output layer 252. A decoder block 240 consists of two layers. The first layer includes a masked self-attention component 242 followed by a layer normalization component 244. The input to the masked self-attention component 242 has a residual connection to layer normalization 244. The output of layer normalization 244 is input into the feed forward neural network 246 with a residual connection to layer normalization component 248. The output of the feed forward neural network is input into layer normalization component 248.

Each token/token flows through all the decoder blocks along its own path. The masked self-attention component 242 allows the neural network 246 to focus on certain features or inputs. The inputs to the decoder block 234, such as the various training datasets 112, 138, are added with the positional embeddings 236 forming context tensor 238. The decoder block 240 predicts each token/token $t_i$ in the target language one-by-one at each time step conditioned on all previously-generated target tokens/tokens $t_1, \ldots, t_{i-1}$.

The masked self-attention component 242 masks the output embeddings from future time steps. The feed-forward neural network 246 processes each output embedding separately. A layer normalization component 244, 248 is used between the layers in order to normalize the inputs across the features.

The linear layer 254 projects the vector produced by the stack of decoders into a logits vector. The softmax layer 256 then turns the scores of the logits vector into probabilities for each token in the vocabulary 258 which are positive and normalized.

Figure 3:
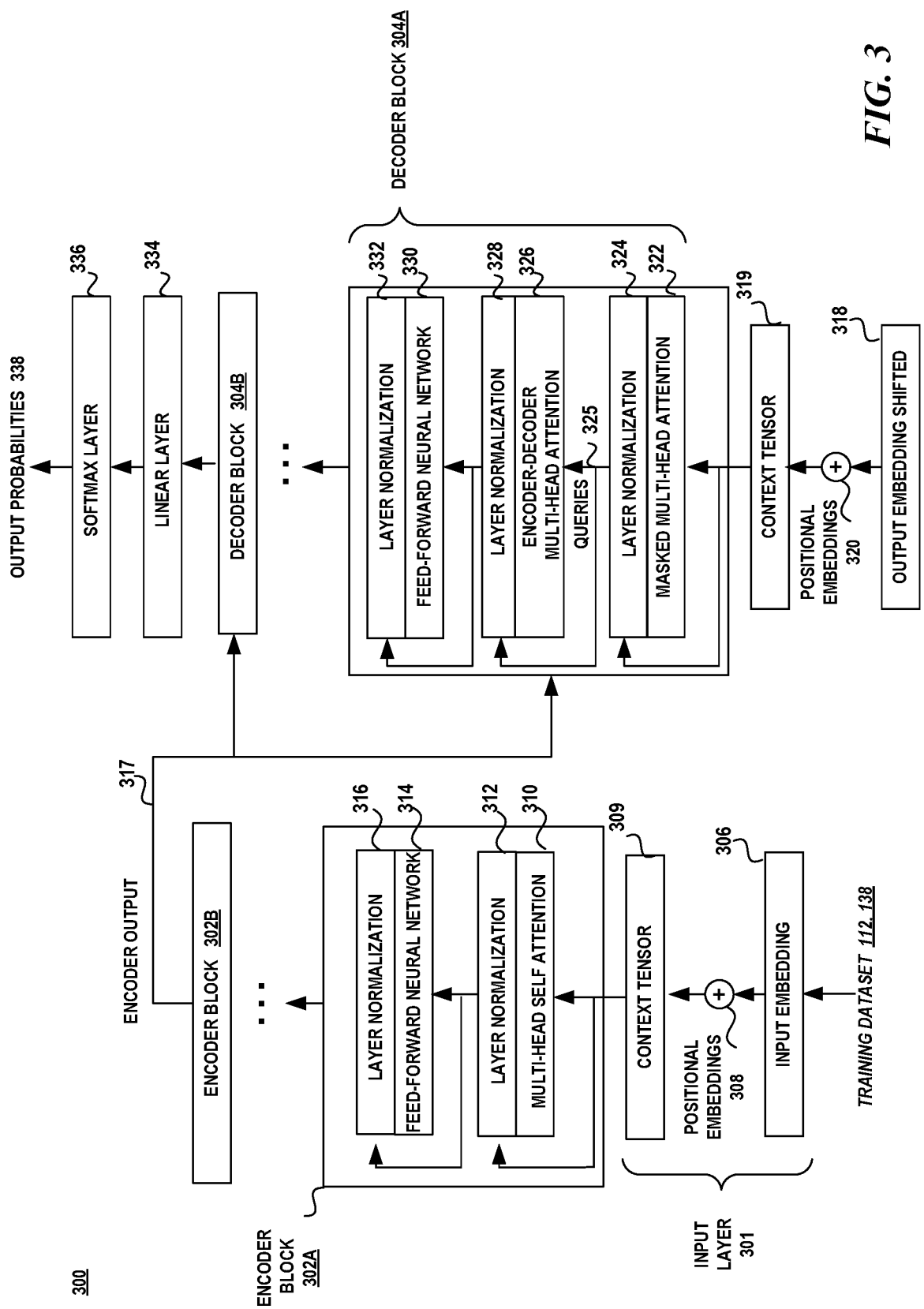
FIG. 3 is a schematic diagram illustrating an exemplary configuration of a neural language model configured as an encoder-decoder neural transformer model with attention.

FIG. 3 illustrates an exemplary configuration of a neural language model shown as a neural transformer model with attention configured with encoder and decoder blocks. The neural language model in this configuration is suited for machine translations where the model learns a function that translates an input sequence into an output sequence. Such machine translations may consist of an input sequence of a particular source code construct and the output sequence is another source code construct or natural language text string. For example, the model may be trained to translate a method signature into a documentation string for the method signature, translate a method signature into a corresponding method body, translate a documentation string for a method into a method body, translate a method body into a method signature, translate a documentation string for a method into a method signature, translate a buggy source code snippet into a repair patch for the buggy source code, and so forth. The neural transformer model 300 contains one or more encoder blocks 302A-302B ("302") coupled to one or more decoder blocks 304A-304B ("304"). The initial inputs to an encoder block 302 are the input embeddings 306 of an input sequence of a training dataset 112, 138. In order to retain the order of the tokens in the input embedding 306, positional embeddings 308 are added to the input embedding 306 forming a context tensor 309. The initial input to the decoder block 304A is a <START> token and thereafter a shifted sequence of the output embeddings 318 from a previous time step to which the positional embeddings 320 are added forming context tensor 319.

An encoder block 302 consists of two layers. The first layer includes a multi-head self-attention component 310 followed by layer normalization component 312. The second layer includes a feed-forward neural network 314 followed by a layer normalization component 316. The context tensor 309 is input into the multi-head self-attention component 310 of the first encoder block 302A with a residual connection to the layer normalization component 312. The output of the layer normalization component 312 is input to the feed-forward neural network 314 with another residual connection to layer normalization component 316. The output of the encoder block 302 is a context tensor or set of hidden representations 317. The set of hidden representations 317 is then sent through additional encoder blocks. At the last encoder block, a context tensor 317 is sent to the decoder 304.

Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identify the relationships between tokens in the long sequence while ignoring other tokens that do not have much bearing on a given prediction.

The multi-head self-attention component 310 takes a context tensor 309 and weighs the relevance of each token represented in the context tensor 309 to each other by generating attention weights for each token in the input embedding 306. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with di, output values which are concatenated to a final value:

MultiHead($Q,K,V$)=Concat(head$_1$, . . . ,head$_h$)$W^o$, where head$_i$=Attention($QW_i^Q$, $KW_i^K$, $VW_i^V$),
with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^Q \in \mathbb{R}^{hd_v \times d_{model}}$.

In order to reduce the training time of the neural transformer, layer normalization is used between the layers. The layer normalization components 312, 316 normalize the inputs across the features. The mean and standard deviation is computed across the feature dimensions.

The feed-forward neural network 314 processes each output encoding separately. The output of the top encoder block is a set of attention vectors K and V 317 which is used by the encoder-decoder multi-head attention layer 326 of the decoder block 304.

The decoder block 304 predicts a token $t_i$ representing a symbol in the grammar of the target programming language one-by-one at each time step conditioned on all previously-generated target tokens $t_1, \ldots t_{i-1}$. A decoder block 304 consists of three layers. The first layer includes a masked multi-head attention component 322 followed by a layer normalization component 324. The output of the layer normalization component 325 is input into the encoder-decoder multi-head attention component 326 with a residual connection to layer normalization component 328. The second layer includes an encoder-decoder multi-head attention component 326 followed by a layer normalization component 328. The third layer includes a feed-forward neural network 330 followed by a layer normalization component 332. The output of layer normalization component 328 is input into the feed-forward neural network 330 with a residual connection to layer normalization component 332.

The masked multi-head attention component 322 receives the output embeddings of the previous timestep. The masked multi-head attention component 322 masks the output embeddings from future time steps. The encoder-decoder multi-head attention layer 322 receives queries from the previous decoder layer and the memory keys and values 317 from the output of the encoder block 302. In this manner, the decoder block 304 can attend to every position of the input sequence. The feed-forward neural network 330 processes each output encoding separately. A layer normalization component 324, 328, 332 is used between the layers in order to normalizes the inputs across the features.

The linear layer 334 projects the vector produced by the stack of decoders into a logits vector. The softmax layer 336 then turns the scores of the logits vector into output probabilities 338 for each token in the model's vocabulary which are positive and normalized.

Methods

Attention now turns to a more detailed description of the methods used in the debugging tool system. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
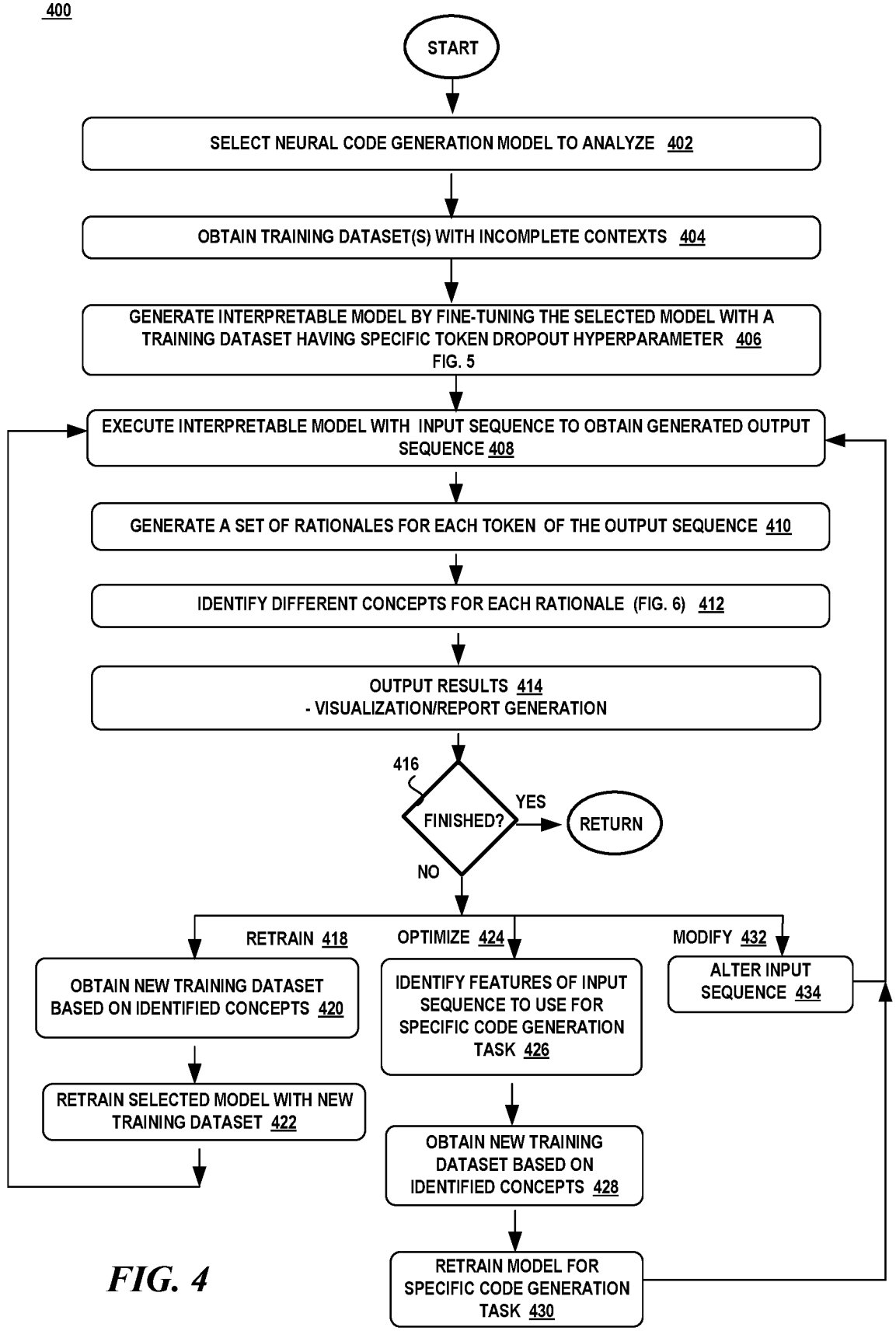
FIG. 4 is a flow diagram illustrating an exemplary method of the debugging tool.

FIG. 4 illustrates an exemplary method 400 of the debugging tool. Initially, a neural language model is selected to debug (block 402). A fine-tuning dataset is obtained with incomplete contexts based on a preconfigured dropout hyperparameter (block 404). The model is then fine-tuned with the fine-tuning dataset thereby generating the interpretable model (block 406).

Figure 5:
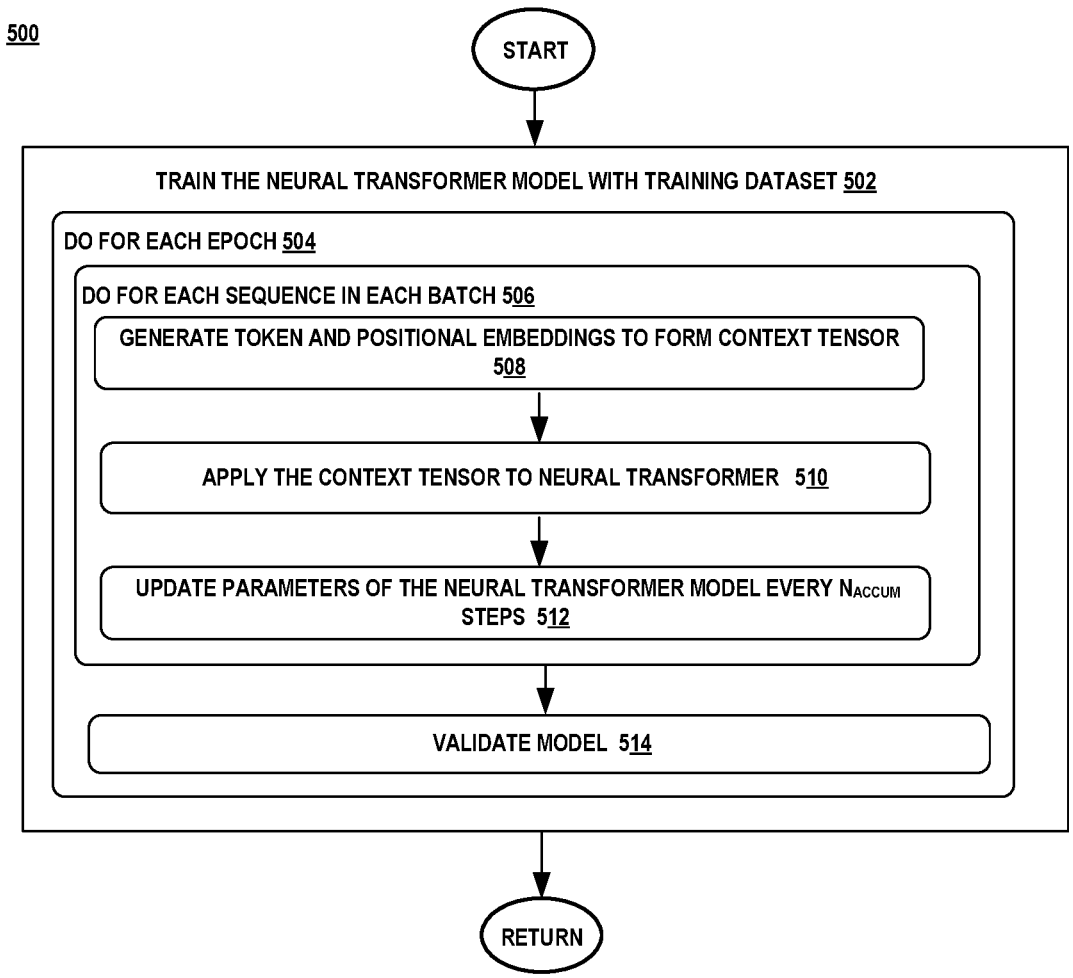
FIG. 5 is a flow diagram illustrating an exemplary method of the training a neural language model.

Turning to FIG. 5, there is shown an exemplary method 500 for fine-tuning the selected neural language model into the interpretable model. Fine-tuning is a form of training where the model's parameters (i.e., embeddings, weights, biases) are learned from the fine-tuning or training dataset. By contrast, inference is the process where the model makes predictions given an input sequence of data.

Neural transformer models are trained iteratively, making multiple passes over the training dataset before converging to a minimum. An epoch represents the entire training dataset passed forwards and backwards through the neural transformer block once. Since the training dataset is very large, it is partitioned into smaller batches. The training is iterative and the entire dataset is passed through the neural transformer in multiple iterations. Each training iteration includes forward propagation, loss calculation, backpropagation steps followed by updating the weights. The training dataset is partitioned into batches with each batch of sequences running through the training process. (Collectively, block 502).

The neural transformer model has multiple blocks and layers within each block so that more detailed relationships within the data are learned as well as how the features interact with each other on a non-linear level. The model architecture, training procedure, data normalization and vocabulary encoding procedures are hyperparameters that are tailored to meet a particular objective. The parameters of a model are the values of the model, such as the weights (e.g., K, V, We, Wp). The hyperparameters influence the way the model is built and how the parameters are learned. (Collectively, block 502).

For each sequence of each batch in each epoch (blocks 504, 506), the T-ordered sequences of tokens are then mapped into numeric vectors and then into respective token embeddings and positional embeddings (block 508).

An embedding is a learned representation for the text-based tokens where tokens that have a common meaning have a common representation. An embedding is a mapping of discrete categorical variables to a vector of continuous numbers. There is an embedding for each token in the vocabulary and a corresponding positional embedding. The token embedding represents the learned representation for the token. The neural transformer model does not read each token sequentially and as such, has no knowledge of the token's position in a sequence without additional position information. The positional embedding is used to embed position information about a token's position in a sequence into a respective neural transformer model. (Collectively, block 508).

Initial values are generated for the token embedding and positional embeddings of each sequence which are then used to form a context tensor. Thereafter, the neural transformer model learns the values for each embedding. Upon the completion of the training phase, the embeddings for each token and the positional embeddings are saved into respective matrices for later use. There is a token embedding matrix, We, that contains an embedding vector for each token $t_i$, i=0 . . . V, and a positional embedding matrix, Wp, that contains an embedding vector $P_j$, j=0 . . . T, for each position, where V is the size of the vocabulary and T is the length of the token sequence. (Collectively, block 508).

The context tensor is input into a respective neural transformer model and passed through the multiple layers of the neural transformer model. For the decoder neural transformer model, the masked self-attention layer takes the context tensor as input and passes it through the multiple layers of multi-head attention, layer normalization and feed forward neural network of each decoder block to finally produce a set of hidden representations. For the encoder-decoder neural transformer model, the first encoder block of the neural transformer model takes the context tensor as input and passes it through the multiple layers of multi-head attention, layer normalization and feed-forward neural network to finally produce a set of hidden representations If there are additional encoder blocks, the output of each encoder block is passed onto the next encoder block with the output of the last encoder block producing the set of hidden representations. The set of hidden representations is passed onto each decoder block. (Collectively, block 510).

The decoder blocks of the neural transformer model take a shifted sequence of an output embedding as input. The masking in the masked multi-head attention layer is used to prevent positions from attending to subsequent positions in the future. The masking combined with the output embeddings shifted by one position ensures that the predictions to position T depend only on the known outputs at positions less than T. Starting with the first token of the output sequence, the tokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 510).

For the decoder neural transformer and the encoder-decoder neural transformer, the feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation algorithm may be used to update the weights. (Collectively, block 510).

At the completion of each batch, the parameters of a respective neural transformer model are updated at a pre-configured frequency denoted as Naccum. Naccum is a gradient accumulation frequency and in one aspect has a value of 8. The parameters include the token embeddings and the positional embeddings which are stored in a respective embedding matrix. (Collectively, block 512).

Next, a neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 514).

Turning back to FIG. 4, upon completion of the model compatibility phase, the interpretable model is then used in a debugging phase. The crux of the debugging phase is understanding how the model made a prediction. The interpretable model is given an input sequence from which an output sequence of source code is predicted (block 408). For each output token generated in the output sequence, the rationale generator generates the smallest set of tokens from the input sequence that influenced the generation of the tokens in the predicted output sequence (block 410).

At each position t, the model takes the tokens of the input sequence in the context $w_{<t}$ to predict the token in the output sequence at position t. Any of the tokens in the input sequence up to position t, $w_{<t}$, can influence the prediction of the token at position t. If the model can make the prediction of the token at position t with a subset, r, of the context, $w_{<t}$, then that subset has the most influence over the prediction of the token at position t. (Collectively, block 410).

The method uses a greedy algorithm to approximate the set of rationales. An optimal solution is nondeterministic polynomial-time hard. Initially, the method starts with an empty set, $r^{(0)}=\emptyset$. The method starts by considering each individual token in the input context, at position 0, . . . , t−1, as the possible candidate token for the set of rationales. The first rationale set is defined as $$r^{(1)} = \arg\max_{j \in \{[t-1]\}} P_\vartheta(w_t|w_j)$$

which is the probability of token $w_t$ at position t in the output sequence when conditioned on only the token $w_j$ which can be at any position t−1 in the input sequence and produces the highest probability $P_\vartheta(w_t|w_j)$. (Collectively, block 410).

The method goes through every token, $w_j$, in the input sequence to the left of the generated token, $w_t$, and computes the conditional distribution of the generated token given the set of previous rationales, $r^{(k)}$, and a candidate rationale token at position j. The conditional probability, $P_\vartheta(w_t|w_{\{r^{(k)} \cup j\}})$ is generated from the interpretable model. These probabilities are computed by feeding the previous set of rationales, $r^{(k)}$, along with the candidate token, $w_j$, as input to the model. The input goes through the multiple layers of the neural transformer model with multi-head attention. Finally, as noted above, the linear layer projects the vector produced by the stack of decoders into a logits vector. The softmax layer then turns the scores of the logits vector into probabilities for each token in the vocabulary which are positive and normalized. From these probabilities, the method considers exclusively the probability of the token, $w_t$. This technique does not require access to the inner workings of the model. (Collectively, block 410).

The candidate token, $w_j$, that generates the highest probability, $P_\vartheta$, is then added to the set of rationales, which is represented mathematically as $$r^{(k+1)} = r^{(k)} \cup \arg\max_{j \in \{[t-1] \setminus r^{(k)}\}} P_\vartheta\left(w_t \middle| w_{\{r^{(k)} \cup j\}}\right).$$

The method stops when the probability of the generated token is approximated by the aggregate probabilities of the tokens in the rationale set which is when arg max $w_t'$ log $P_\vartheta(w_t'|w_r)-w_t<e$ for some error tolerance e, say e=1e-6. (Collectively, block 410).

The set of rationales for each token in the output sequence is generated one at a time. To obtain the set of rationales for the entire output sequence, the method iterates over each token in the output sequence to obtain the set of rationales from the input sequence for the entire output sequence. (Collectively, block 410).

Figure 6:
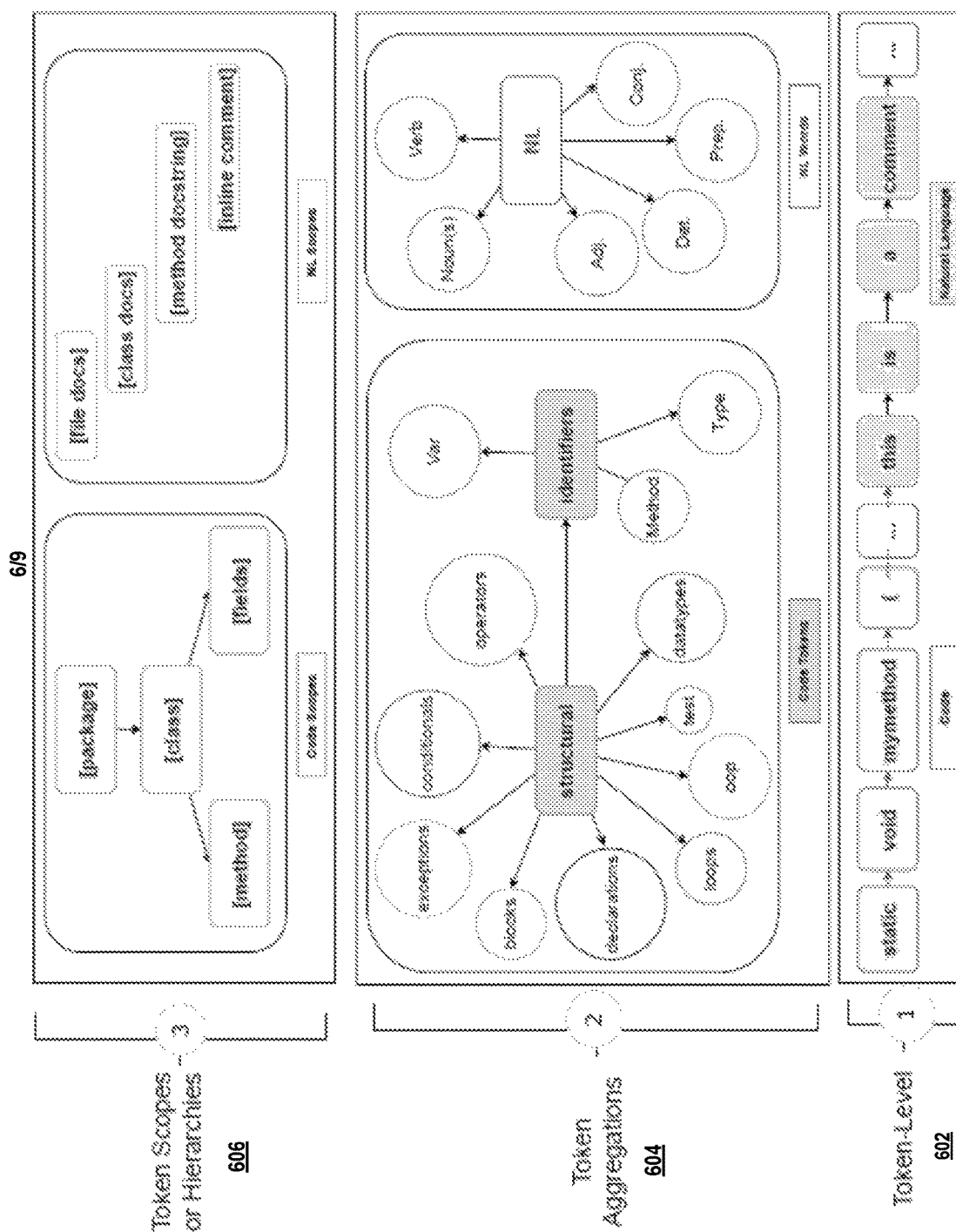
FIG. 6 is a schematic diagram of the various levels of source code and natural language structural concepts.

Each of the rationales is then transformed into a corresponding language structural concept or category: source code structural concept/category or natural language structural concept/category. Turning to FIG. 6, in an aspect, there are three levels of structural concepts: a token-level concept 602; a token aggregation concept 604; and a token scope or hierarchy concept 606. Each token in the rationale set is at the token-level 602 and consist of a source code token or a natural language word. As shown in FIG. 6, the source code tokens are static, void, mymethod, (and the natural language tokens are "this", "is", "a", "comment". (Collectively, block 412).

The token aggregation concept level 604 associates a category with each token. For source code tokens, the category is defined by the grammar of the programming language. In particular, the category is the non-terminal symbol of a production rule of the grammar of the underlying programming language. For example, the token aggregation concept for source code tokens includes exceptions, conditionals, operators, datatypes, tst, oop, loops, declarations, blocks, and identifiers that include variable, method and type. For natural language text, each word is categorized by the function of the word in the grammar of the natural language, such as noun, verb, adjective, conjunctive, preposition, and determiner. (Collectively, block 412).

The token scope or hierarchy level defines a rationale in terms of its scope within a source code program. For a source code token, the scopes include package, class, method or field where the token is defined or used in the source code program. For natural language text, the scope pertains to the location in the program where the natural language text appears, such as inline comment, method docstring, class docs or file docs. (Collectively, block 412).

The token aggregation level and the token scopes can be generated from various compiler tools that parse an input sequence into a parse tree or abstract syntax tree. Each node in the abstract syntax tree contains additional information such as the aggregation level of a token and its scope. (Collectively, block 412).

The set of rationales and/or the language structural concept classification is output. The output may be displayed in a user interface or source code editor as described below with respect to FIGS. 7 and 8 or in a generated report. (Collectively, block 414).

The rationales and/or the language structural concepts/categories are used to identify where the model needs improvement. In an aspect, the rationales and/or the language structural concepts are used to identify the type of training data needed to improve the model's performance with respect to the current code generation task 418. In this situation, a new training dataset based on the identified language structural concept (i.e., token aggregations or token scopes) is obtained (block 420) and the neural language model is retrained with the new training dataset (block 422).

In another aspect, the rationales and/or the language structural concepts are used to identify the type of training data needed to optimize the model for a particular code generation task 424. The language structural concepts/categories are used to identify the features of the input sequence that should be used to improve the neural language model's performance for a specific code generation task (block 426). A new training dataset is generated containing the language structural concepts of the rationales (block 428) and the neural language model is retrained with the new training dataset to perform the specified code generation task (block 430).

In yet another aspect, the rationales and/or the language structural concepts are used to identify the tokens in an input sequence that contributed to an erroneous output sequence that can be rectified by generating a new input sequence that avoids the error 432. A developer may alter the input sequence (block 434) and re-execute the interpretable model (block 408).

An error in the output sequence generated by a neural language model is often caused by the training data used to train the model. For example, a code generation model may make two categories of mistakes identified by the language structural concepts. A developer collects different samples for each category. The debugging tool is used to extract rationales and to aggregate them over the two categories of mistakes and extract interpretability insights at the scope level. The developer realizes from the scope concepts that the error originated from two scopes, package and class. This information is then used to change the input of the model and/or to train the model on different training data.

The method iterates blocks 408 through block 416 until finished (block 416—yes).

Figure 7:
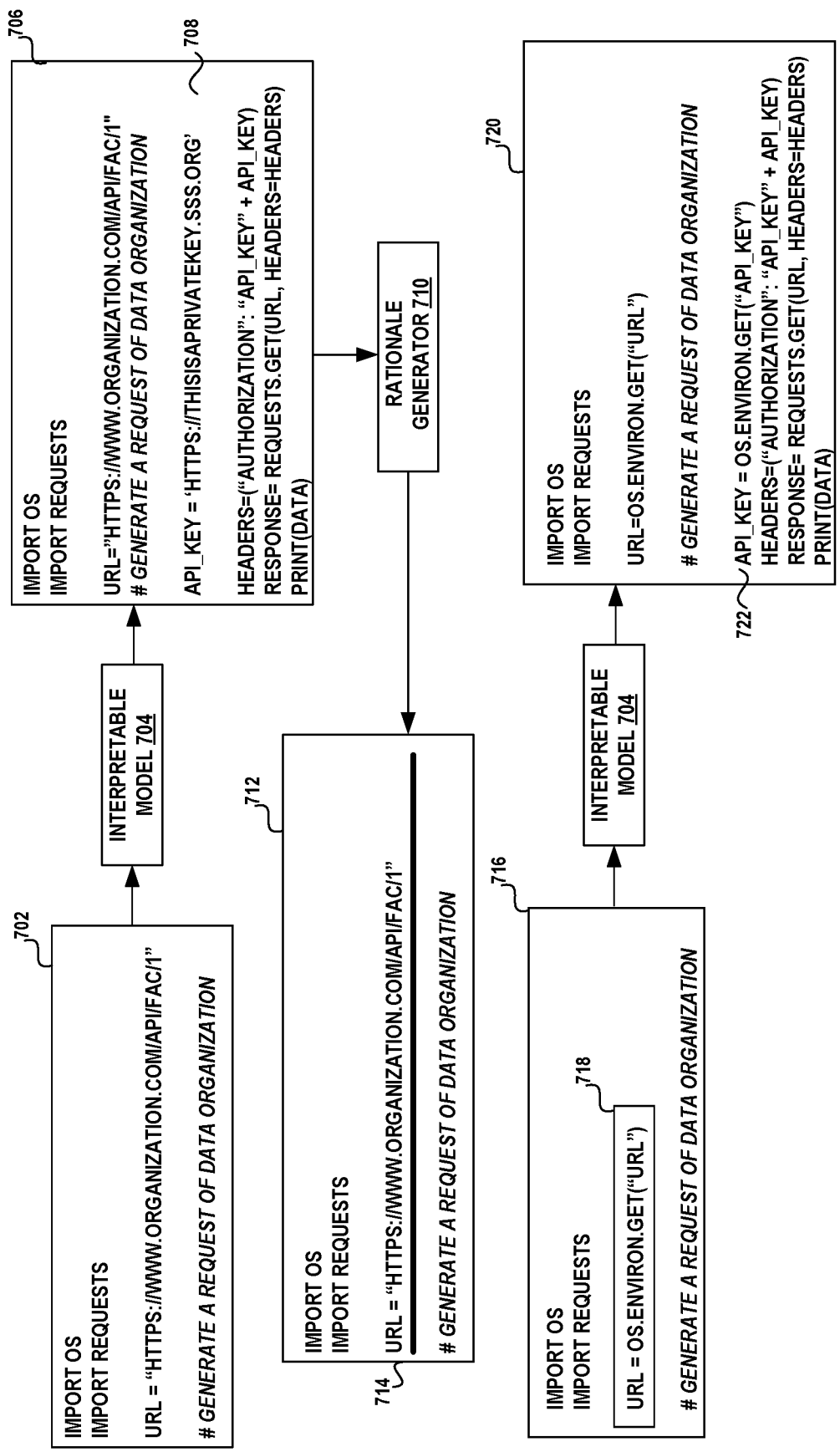
FIG. 7 is a schematic diagram illustrating a first example of the usage of the debugging tool.

Attention now turns to an exemplary illustration of the usage of the debugging tool. Turning to FIG. 7, there is shown a source code snippet 702 containing a few lines of source code and a line of code documentation. The source code snippet 702 includes an assignment statement that assigns the variable URL to an active URL address—URL=HTTPS://WWW.ORGANIZATION.COM/API/FAC/1.

The interpretable model 704 generates a method body given source code snippet 702. The method body generated by the interpretable model 704 includes the source code statement API_KEY=HTTPS://THISISAPRIVATEKEY.SSS.org 708. Statement 708 is an error since it leaks a private key which should not be output. This data leakage is attributable to the private key having been used in the training data of the model. The debugging tool invokes the rationale generator 710 which shows the rationale that caused the interpretable model to generate statement 708 which is underlined in source code snippet 712—URL=HTTPS://WWW.ORGANIZATION.COM/API/FAC/1., 714.

A developer recognizes the error and alters the input sequence in the source code snippet 716 to include a different value for the variable URL—URL=OS.ENVIRON.GET("URL") 718. The revised input sequence 716 is input back into the interpretable model 704 that generates a method body which does not contain any data leakage. The model 704 generates a new output 720 with statement 722 which is as follows: API_KEY=OS.ENVIRON.GET("API_KEY").

Figure 8:
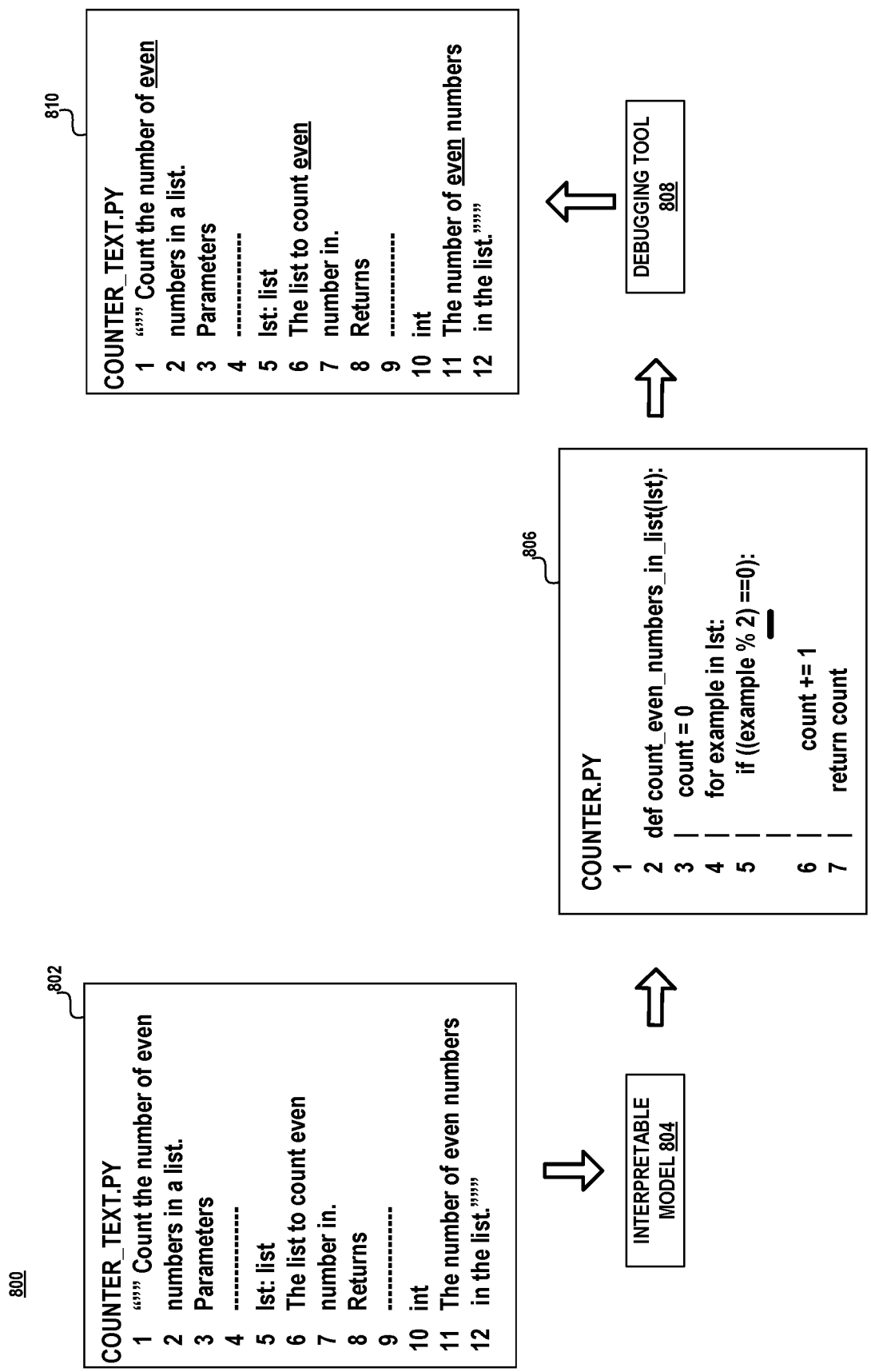
FIG. 8 is a schematic diagram illustrating a second example of the usage of the debugging tool.

Turning to FIG. 8, there is shown an illustration of an exemplary usage of the debugging tool in a source code editor or integrated development environment (IDE). The integration of the debugging tool into a source code editor or IDE allows a developer to easily interpret the contribution of each token to the output produced by a code generation model.

A developer requests a method body for a natural language description of the method body from an interpretable model configured to generate a method body given a natural language description. The natural language description is contained in the source code COUNTER_TEXT.PY 802. The interpretable model 804 generates the method body shown in source code 806. The debugging tool 808 annotates each output token generated in the method body with the input tokens which contributed the most towards generating that token in the method body.

The developer may select a particular token in the generated method body to investigate. As shown in source code snippet 804, the developer highlights the specific token in the method body which is the token "2" in line #5. The IDE invokes the debugging tool 808 to generate the rationales which are underlined in the source code snippet 810. Source code snippet 810 highlights the words "even" in lines 1, 6 and 11 of the input sequence of COUNTER_TEXT.PY 806.

Exemplary Operating Environment

Figure 9:
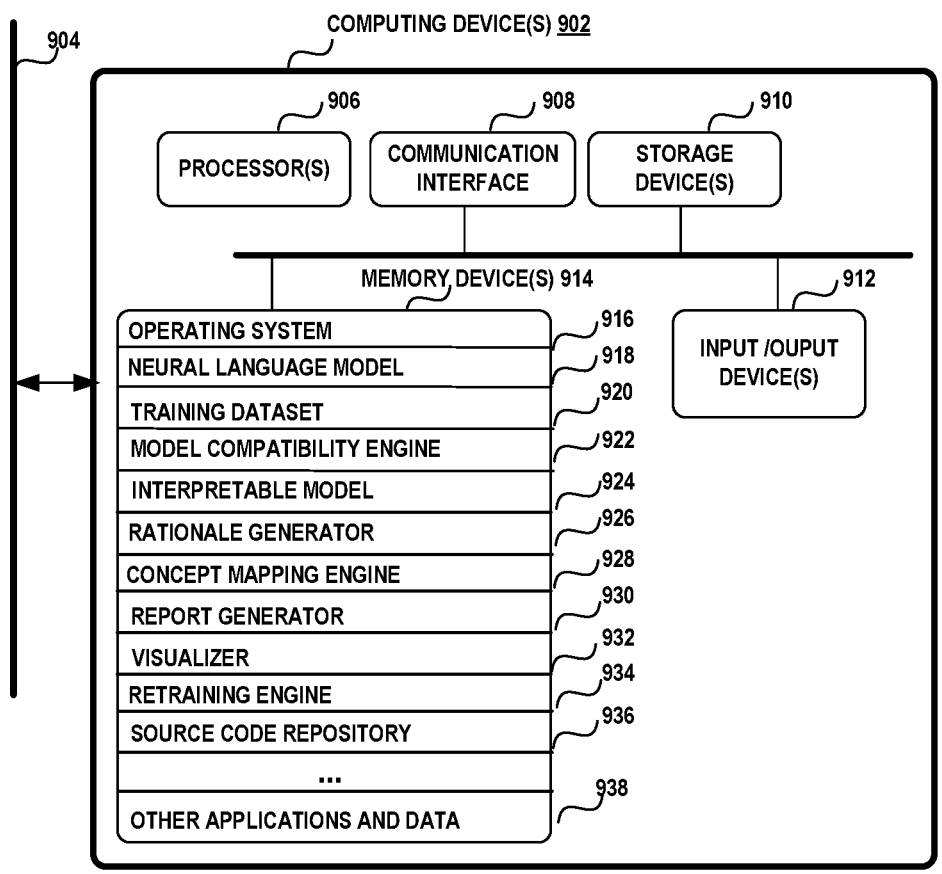
FIG. 9 is a block diagram illustrating an exemplary operating environment.

Attention now turns to a discussion of an exemplary operating environment 900. FIG. 9 illustrates an exemplary operating environment 900 in which one or more computing devices 902 are used to develop the debugging tool and the model compatibility engine and perform the debugging phase in a target system. However, it should be noted that the aspects disclosed herein is not constrained to any particular configuration of the computing devices.

A computing device 902 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 900 may be configured in a network environment, a distributed environment, a multi-processor environment, or a stand-alone computing device having access to remote or local storage devices.

A computing device 902 may include one or more processors 906, one or more communication interfaces 908, one or more storage devices 910, one or more memory devices or memories 914 and one or more input/output devices 912. A processor 906 may be any commercially available or customized processor and may include dual microprocessors and multi-processor architectures. A communication interface 908 facilitates wired or wireless communications between the computing device 902 and other devices. A storage device 910 may be computer-readable medium that does not contain propagating signals, such as modulated data signals transmitted through a carrier wave. Examples of a storage device 910 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 910 in the computing devices 902. The input/output devices 912 may include a keyboard, mouse, pen, voice input device, touch input device, display, speakers, printers, etc., and any combination thereof.

A memory device or memory 914 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 914 may also include one or more external storage devices or remotely located storage devices that do not pertain to propagated signals, such as modulated data signals transmitted through a carrier wave.

A memory device or memory 914 may contain instructions, components, and data. A component is a software program that performs a specific function and is otherwise known as a module, program, and/or application. The memory device 914 may include an operating system 916, a neural language model 918, a training dataset 920, a model compatibility engine 922, an interpretable model 924, a rationale generator 926, a concept mapping engine 928, a report generator 930, a visualizer 932, a retraining engine 934, a source code repository 936, and other applications and data 938.

The computing device 902 may be communicatively coupled via a network 904. The network 904 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 904 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of debugging a neural language model to determine how the model made its predictions. The technical feature associated with addressing this problem is the identification of the features in the input sequence that had the most impact on the generation of the output and a classification of these features in terms of source code and natural language structural concepts. The technical effect achieved is the identification of defects in the training data used to create the model which are remedied by retraining the model with training data having the identified language structural concepts thereby improving the accuracy of the model.

CONCLUSION

A system is disclosed comprising: one or more processors; and a memory that stores one or more programs that are configured to be executed by the one or more processors, the one or more programs including instructions to perform actions that: obtain a source code snippet generated by a neural language model given an input sequence of source code, wherein the input sequence includes a plurality of input source code tokens, wherein the source code snippet includes a plurality of output source code tokens; locate an error in the source code snippet generated by the neural language model, wherein the error is associated with a select token in the source code snippet; generate a set of rationales for the select token in the source code snippet, wherein the set of rationales comprises a smallest subset of tokens of the input sequence of source code tokens that led to generation of the select token in the source code snippet generated by the neural language model; and identify a source of the error in the source code snippet generated by the neural language model to at least one token of the set of rationales associated with the select token in the source code snippet.

In an aspect, the one or more programs include further instructions to perform actions that: alter the input sequence of source code based on the identified source of the error; and generate a new source code snippet from the neural language model given the altered input sequence of source code.

In an aspect, the one or more programs including instructions to perform actions that: classify each of the tokens in the set of rationales with a corresponding token aggregation category; identify a token aggregation category of the source of the error; and retrain the neural language model with a training dataset of source code snippets associated with the token aggregation category.

In an aspect, the token aggregation category includes non-terminal symbols of production rules of a grammar of a programming language of the source code snippet.

In an aspect, the one or more programs including instructions to perform actions that: classify each of the tokens in the set of rationales with a corresponding token scope category; and retrain the neural language model with a training dataset of source code snippets associated with the token scope category.

In an aspect, the token scope category consists of method, package, field, and class. In an aspect, the neural language model includes a neural transformer model with attention configured to generate source code. In an aspect, the neural language model includes a recurrent neural network configured to generate source code. In an aspect, generate a set of rationales for the select token in the source code snippet is based on a conditional probability of the selected token conditioned on only the source code tokens of the set of rationales having a highest probability.

A computer-implemented method is disclosed, comprising: obtaining in a source code editor an output source code snippet generated from a neural language model given an input source code snippet, wherein the output source code snippet includes an output sequence of source code tokens, wherein the input source code snippet includes an input sequence of tokens; selecting a select one of the source code tokens of the output source code snippet generated by the neural language model; computing a smallest subset of source code tokens of the input source code sequence that led to generation of the selected one of the source code tokens of the output source code snippet by the neural language model; and identifying in the source code editor, each of the source code tokens of the input source code sequence of the smallest subset.

In an aspect, the smallest subset of source code tokens of the input source code sequence is based on a conditional probability of the selected token conditioned on only the source code tokens of the smallest subset having a highest probability. In an aspect, the conditional probability is generated by the neural language model.

In an aspect, the computer-implemented method further comprises: associating a token scope category with each of the source code tokens of the smallest subset; and retraining the neural language model with a training dataset comprising source code associated with the token scope.

In an aspect, the computer-implemented method further comprises: associating a token aggregation category with each of the source code tokens of the smallest subset; and retraining the neural language model with a training dataset comprising source code associated with the token aggregation structure. In an aspect, the neural language model includes a neural transformer model with attention or a recurrent neural network.

One or more hardware storage devices are disclosed having stored thereon computer executable instructions that are structured to be executable by one or more processors of a computing device to thereby cause the computing device to: obtain a source code snippet generated by a neural language model given an input sequence of natural language text, wherein the input sequence includes a plurality of input natural language tokens, wherein the source code snippet includes a plurality of source code tokens; select a select one of the source code tokens of the output source code snippet generated by the neural language model; generate a smallest subset of natural language tokens of the input sequence that led to generation of the selected one of the source code tokens of the output source code snippet by the neural language model; and identify in a user interface, each of the natural language tokens of the input source code sequence of the smallest subset.

In an aspect, the smallest set of natural language tokens of the input sequence is based on a conditional probability distribution over the select one of the source code tokens of the output source code snippet when conditioned on each natural language token of the smallest subset having a highest probability.

In an aspect, the one or more hardware storage devices have stored thereon further computer executable instructions that are structured to be executable by one or more processors of a computing device to thereby cause the computing device to: associate a token scope category with each of the natural language tokens of the smallest subset; and retrain the neural language model with a training dataset containing natural language text associated with the token scope category.

In an aspect, the one or more hardware storage devices have stored thereon further computer executable instructions that are structured to be executable by one or more processors of a computing device to thereby cause the computing device to: associate a token aggregation category with each of the natural language tokens of the smallest subset; and retrain the neural language model with a training dataset containing natural language text associated with the token aggregation category.

In an aspect, the neural language model is a neural transformer model with attention or a recurrent neural network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

What is claimed:

1. A system comprising:
one or more processors; and
a memory that stores one or more programs that are configured to be executed by the one or more processors, the one or more programs including instructions to perform actions that:
obtain a source code snippet generated by a neural language model given an input sequence of source code, wherein the input sequence includes a plurality of input source code tokens, wherein the source code snippet includes a plurality of output source code tokens;
locate an error in the source code snippet generated by the neural language model, wherein the error is associated with a select token in the source code snippet;
generate a set of rationales for the select token in the source code snippet, wherein the set of rationales comprises a smallest subset of tokens of the input sequence of source code tokens that led to generation of the select token in the source code snippet generated by the neural language model; and
identify a source of the error in the source code snippet generated by the neural language model to at least one token of the set of rationales associated with the select token in the source code snippet.

2. The system of claim 1, wherein the one or more programs include further instructions to perform actions that:
alter the input sequence of source code based on the identified source of the error; and
generate a new source code snippet from the neural language model given the altered input sequence of source code.

3. The system of claim 1, wherein the one or more programs including instructions to perform actions that:
classify each of the tokens in the set of rationales with a corresponding token aggregation category;
identify a token aggregation category of the source of the error; and
retrain the neural language model with a training dataset of source code snippets associated with the token aggregation category.

4. The system of claim 3, wherein the token aggregation category includes non-terminal symbols of production rules of a grammar of a programming language of the source code snippet.

5. The system of claim 1, the one or more programs including instructions to perform actions that:
classify each of the tokens in the set of rationales with a corresponding token scope category; and
retrain the neural language model with a training dataset of source code snippets associated with the token scope category.

6. The system of claim 5, wherein the token scope category consists of method, package, field, and class.

7. The system of claim 1, wherein the neural language model includes a neural transformer model with attention configured to generate source code.

8. The system of claim 1, wherein the neural language model includes a recurrent neural network configured to generate source code.

9. The system of claim 1, generate a set of rationales for the select token in the source code snippet is based on a conditional probability of the selected token conditioned on only the source code tokens of the set of rationales having a highest probability.

10. A computer-implemented method, comprising:
obtaining in a source code editor an output source code snippet generated from a neural language model given an input source code snippet, wherein the output source code snippet includes an output sequence of source code tokens, wherein the input source code snippet includes an input sequence of tokens;
selecting a select one of the source code tokens of the output source code snippet generated by the neural language model;
computing a smallest subset of source code tokens of the input source code sequence that led to generation of the selected one of the source code tokens of the output source code snippet by the neural language model; and
identifying in the source code editor, each of the source code tokens of the input source code sequence of the smallest subset.

11. The computer-implemented method of claim 10, wherein the smallest subset of source code tokens of the input source code sequence is based on a conditional probability of the selected token conditioned on only the source code tokens of the smallest subset having a highest probability.

12. The computer-implemented method of claim 11, wherein the conditional probability is generated by the neural language model.

13. The computer-implemented method of claim 10, further comprising:
associating a token scope category with each of the source code tokens of the smallest subset; and
retraining the neural language model with a training dataset comprising source code associated with the token scope.

14. The computer-implemented method of claim 10, further comprising:
associating a token aggregation category with each of the source code tokens of the smallest subset; and
retraining the neural language model with a training dataset comprising source code associated with the token aggregation structure.

15. The computer-implemented method of claim 10, wherein the neural language model includes a neural transformer model with attention or a recurrent neural network.

16. One or more hardware storage devices having stored thereon computer executable instructions that are structured to be executable by one or more processors of a computing device to thereby cause the computing device to:
obtain a source code snippet generated by a neural language model given an input sequence of natural language text, wherein the input sequence includes a plurality of input natural language tokens, wherein the source code snippet includes a plurality of source code tokens;
select a select one of the source code tokens of the output source code snippet generated by the neural language model;
generate a smallest subset of natural language tokens of the input sequence that led to generation of the selected one of the source code tokens of the output source code snippet by the neural language model; and
identify in a user interface, each of the natural language tokens of the input source code sequence of the smallest subset.

17. The one or more hardware storage devices of claim 16, wherein the smallest set of natural language tokens of the input sequence is based on a conditional probability distribution over the select one of the source code tokens of the output source code snippet when conditioned on each natural language token of the smallest subset having a highest probability.

18. The one or more hardware storage devices of claim 16 having stored thereon computer executable instructions that are structured to be executable by one or more processors of a computing device to thereby cause the computing device to:
- associate a token scope category with each of the natural language tokens of the smallest subset; and
- retrain the neural language model with a training dataset containing natural language text associated with the token scope category.

19. The one or more hardware storage devices of claim 16 having stored thereon computer executable instructions that are structured to be executable by one or more processors of a computing device to thereby cause the computing device to:
- associate a token aggregation category with each of the natural language tokens of the smallest subset; and
- retrain the neural language model with a training dataset containing natural language text associated with the token aggregation category.

20. The one or more hardware storage devices of claim 16, wherein the neural language model is a neural transformer model with attention or a recurrent neural network.

\* \* \* \* \*